June 9, 1931.  W. J. ANDRES ET AL  1,809,541

OPERATING DEVICE

Filed Dec. 23, 1926

INVENTOR
WILLIAM J. ANDRES
CHARLES T. WAFFLE
BY
ATTORNEY

Patented June 9, 1931

1,809,541

UNITED STATES PATENT OFFICE

WILLIAM J. ANDRES AND CHARLES T. WAFFLE, OF SOUTH BEND, INDIANA, ASSIGNORS TO BENDIX BRAKE COMPANY, OF SOUTH BEND, INDIANA, A CORPORATION OF ILLINOIS

OPERATING DEVICE

Application filed December 23, 1926. Serial No. 156,549.

This invention relates to operating devices for brakes or similar mechanisms, and is illustrated as embodied in an adjustable device for operating the cam-shaft of a front wheel brake. An object of the invention is to provide an inexpensive but very strong device for rocking the cam-shaft or its equivalent, and which is preferably capable of ready adjustment, as for example to compensate for wear of the brake.

In one desirable arrangement, the device includes a part or arm having a sleeve arranged to embrace the shaft, and preferably provided with parallel side flanges, between which there is arranged a thrust arm which may be formed with a sleeve portion loosely embracing the first sleeve. In the arrangement illustrated in the drawings, the side flanges are connected by a thrust device, which is illustrated as a nut spot-welded to the flanges and through which a set-screw is threaded to provide the desired adjustment, and the set-screw or its equivalent engages the loosely mounted arm which extends between the flanges.

The above and other objects and features of the invention, including various novel combinations of parts and desirable particular constructions, will be apparent from the following description of one illustrative embodiment shown in the accompanying drawings, in which:

Figure 1 is a section through one front brake and associated parts, looking toward the front of the car at the left front brake;

Figure 3:
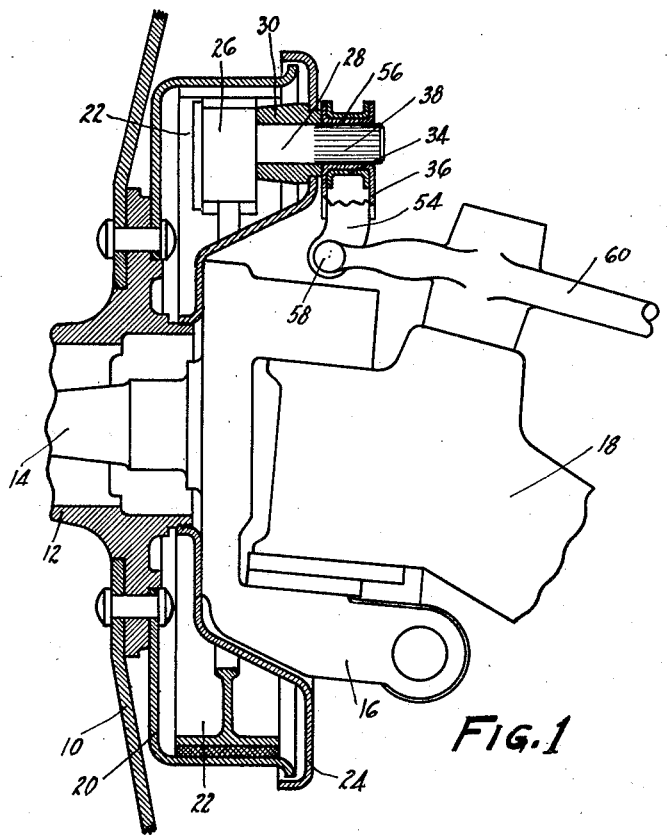
Figure 3 is a front elevation of the parts shown in Figure 2.
Figure 2:
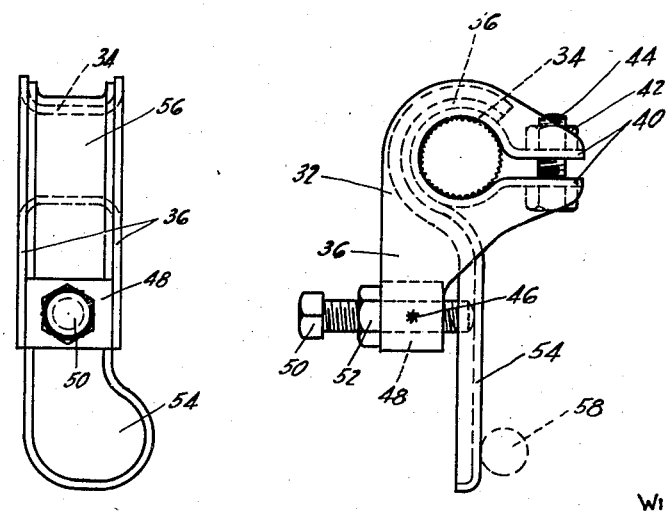
Figure 2 is a side elevation of the operating device detached from the brake.

The parts shown in Figure 1 include a wheel 10, the hub 12 of which is rotatably mounted on the spindle 14 of a front knuckle 16 which is swivelled, by the usual king-pin or its equivalent, at one end of the front axle 18. The brake includes a drum 20 rotating with the wheel, and shoes 22 supported on the usual backing plate 24, carried by the knuckle 16, and operated by means illustrated as a cam 26 having a shaft 28 journalled in a support 30 carried by the backing plate 24. The present invention relates to the means for operating the shaft 28 or its equivalent.

The operating device includes generally a part 32 having a sleeve 34 shown as formed in any desired manner with internal splines for engagement with splines 38 on the shaft 28 and having side flanges at the opposite ends of the sleeve extended to form spaced parts 36 which are connected at their ends to form an operating arm for the shaft. The sleeve 34 is interrupted at one side to form radial flanges 40 projecting outwardly from the sleeve and arranged to be drawn toward each other to clamp the sleeve on the shaft by tightening up a nut 42 on a clamping bolt 44 to contract the sleeve 34.

The ends of the flanges or parts 36 are illustrated as being connected by being spot-welded at 46 to the sides of a rectangular nut 48 engaging a thrust device such as an adjustable set-screw 50 which may be adjusted in the nut 48 and which can be locked in adjusted position by a lock-nut 52. The set-screw 50 is engaged by a loosely mounted thrust arm 54, pressed from sheet metal, and which engages the end of the set-screw, and then extends upwardly between the flanges 36, and which is formed at its upper end with a sleeve portion 56 loosely embracing the sleeve 34. The sleeve portion 56 preferably extends a little more than 180 degrees around the sleeve 34 so that the thrust arm 54 will not be accidentally disengaged from the operating device.

The thrust arm 54 is engaged at its lower end by operating means such as a ball 58 integrally formed at one end of a generally horizontal lever 60 fulcrumed on the axle 18. The parts are preferably so arranged that when the brake is applied the center of the ball 58 is in or immediately adjacent the swivelling axis of the wheel 10, so that the brake-operating mechanism does not interfere with swivelling the wheel.

The thrust arm 54 is shown as a sheet steel stamping, and is preferably channel-shaped in order to form stiffening flanges at its opposite edges, and we prefer that the set-screw 50 should engage the bottom of the channel so formed.

While one illustrative embodiment of the invention has been described in detail, it is not our intention to limit its scope to that particular embodiment or otherwise than by the terms of the appended claims.

We claim:

1. An operating device comprising, in combination, a shaft, an arm fixed on the shaft and having a sleeve portion embracing the shaft, a second arm having a sleeve portion loosely embracing the sleeve portion of the fixed arm, and a thrust member through which the second arm operates the fixed arm and the shaft.

2. An operating device comprising, in combination, a shaft, an arm fixed on the shaft and having a sleeve portion embracing the shaft, a second arm having a sleeve portion loosely embracing the sleeve portion of the fixed arm, said arms being interengaged against relative axial displacement, and a set screw carried by one arm engaging the other arm and adjustable to vary the angular relationship of the arms.

3. An operating device comprising, in combination, a shaft, an arm fixed on the shaft and having a sleeve portion embracing the shaft provided with parallel side flanges, a second arm arranged between said flanges and having a sleeve portion loosely embracing the sleeve portion of the fixed arm and having a portion between said flanges, and a thrust member between and carried by the flanges and engaging the second arm and through which the second arm operates the fixed arm and the shaft.

4. An operating device comprising, in combination, a shaft, an arm fixed on the shaft and having a pair of spaced side flanges, a nut supported between said flanges, a second arm loosely supported upon the shaft, and a set screw adjustably threaded through the nut and engaging said loosely supported arm to vary the relative angular relationship of the arm.

5. An operating device comprising, in combination, a shaft, a pair of arms, one of which is loosely mounted and the other of which is fixed on the shaft, and one of which arms has a pair of spaced flanges, a nut between and secured to said flanges, and a set-screw threaded through the nut and engaging the other arm, said other arm being arranged between the flanges of the first arm and between the nut and the shaft.

6. An operating device comprising a pressed-metal part formed with a cylindrical shaft-receiving sleeve and with side flanges at the ends of the sleeve and perpendicular thereto and extended to form a pair of spaced arms.

7. An operating device comprising a pressed-metal part formed with a cylindrical shaft-receiving sleeve interrupted at one side and provided with outwardly-extending radial flanges and with side flanges at the ends of the sleeve arranged perpendicularly to the radial flanges and extending angularly to form a pair of spaced apart arms, a clamping device carried by and acting on the radial flanges to contract the sleeve about the shaft, and an adjustable thrust member carried between and acting on said arms.

8. An operating device comprising a pressed-metal part formed with a cylindrical shaft-receiving sleeve and with side flanges at the ends of the sleeve and perpendicular thereto and extended to form a pair of spaced arm, together with a thrust arm having a partial sleeve at one end loosely embracing the sleeve of the pressed-metal part.

9. An operating device comprising, in combination, a part having a sleeve portion and a pair of spaced members extending therefrom, a thrust device connecting the ends of said spaced members, and an arm operatively engaged by said thrust device and extending upwardly between the spaced members and engaging the side of the sleeve.

In testimony whereof, we have hereunto signed our names.

WILLIAM J. ANDRES.
CHARLES T. WAFFLE.